United States Patent Office 2,760,940
Patented Aug. 28, 1956

2,760,940

PLATINUM AND PALLADIUM CATALYSTS

Eugene F. Schwarzenbek, Montclair, N. J., assignor to M. W. Kellogg Company, Jersey City, N. J., a corporation of Delaware No Drawing. Application September 26, 1951, Serial No. 248,470

6 Claims. (Cl. 252—466)

This invention relates to a novel catalyst comprising platinum or palladium distributed on an adsorptive carrier material, and more particularly pertains to a hydrocarbon conversion catalyst having metallic platinum or palladium distributed on an alumina support. This invention also relates to a novel method of preparing the aforedescribed catalyst.

Various catalysts have been suggested for the conversion of hydrocarbons in a variety of reactions at elevated temperatures, including hydrogenation, dehydrogenation, aromatization, cyclization, isomerization, cracking and hydrocracking. Among the various catalysts which have been employed for the hydrogenation and dehydrogenation of hydrocarbons, particularly for the reforming and hydroforming of petroleum naphtha fractions, there is a catalyst containing minor amounts of platinum dispersed on a major proportion of an alumina carrier. Various techniques have been proposed for distributing platinum or palladium on an alumina type catalyst, such as for example, the precipitating of platinum on an alumina carrier as a platinous oxide by boiling $K_2PtCl_4$ and then reducing the oxide with a suitable reducing salt. In another process, a chloroplatinic solution is treated with hydrogen sulfide by forming platinic sulfide which is stirred into a slurry of alumina gel. The mixture is first dried and then calcined at high temperatures to produce an active platinum on alumina catalyst. In the preparation of the catalyst, generally, it is found that catalysts containing approximately the same metal content and which have been prepared by methods differing only slightly often produce substantially different results in the catalyst activity for hydrocarbon conversion and other catalytic reactions. This phenomenon appears to indicate that such catalysts are different in constitution by virtues of the changes in the methods of preparation.

An object of the present invention is to provide a novel method for the preparation of a contact material having platinum or palladium included therein.

Another object of this invention is to provide a novel method for the distribution of platinum and palladium on an adsorptive carrier.

A further object of the present invention is to provide a novel catalyst comprising platinum or palladium on a carrier material.

Still another object of the present invention is to provide a novel process for preparing a hydrocarbon conversion catalyst comprising alumina and a metal selected from the group consisting of platinum and palladium.

A still further object of this invention is to provide a novel catalyst comprising a major proportion of alumina and a minor proportion of a metal of the group consisting of platinum and palladium.

Other objects and advantages of this invention will be apparent from the following description and explanation thereof.

In accordance with the present invention, a novel catalyst is obtained by a method which comprises combining a metal or a compound of a metal selected from the group consisting of platinum and palladium, a carrier material, with or without an activating agent, and a promoting agent selected from the group consisting of an alcohol and a ketone which have a water solubility of at least about 0.05% by weight, and then decomposing the metal compound to deposit the metal on said adsorptive material.

The function of the promoting agent of this invention is not clearly understood, however, the resultant activity of the catalyst material prepared by employing the promoting agent clearly indicates that a novel catalyst is obtained. Generally, the promoting agent includes a variety of classes of compounds, such as for example, primary, secondary and tertiary aliphatic monohydric alcohols, aliphatic dihydric alcohols, aliphatic tri-hydric alcohols, ketones of the aliphatic and aromatic type, aromatic alcohols, etc. The alcohols can be hydroxyl substituted hydrocarbon compounds or they can comprise substituted alcohols in which there are present groups, such as for example, amino, sulfhydryl, nitro, nitroso halogen, alkoxyalkyl, carboalkoxy, etc. Among the aliphatic alcohols, it is preferred to employ the alkanols containing about 1 to 9 carbon atoms in the molecule. With respect to aliphatic polyhydric alcohols, it is preferred to employ those containing not more than 10 carbon atoms in the molecule. The ketones may comprise the aliphatic or aromatic types, however, it is preferred using the aliphatic ketones, particularly the alkanones containing not more than 4 carbon atoms in the molecule. It is to be noted that in the case of the promoting agents, it is desired that they possess a water solubility of at least about .05% by weight at 70° F.

For the purposes of this specification and the appended claims it is intended that "water solubility" of the promoting agent will be the minimum solubility just mentioned. Water solubility is important from the standpoint of obtaining uniform distribution of the promoting agent throughout the catalyst mass prior to calcination. The components of the catalyst prior to calcination may be in the form of a slurry or gel which contain sufficient amounts of water to provide for adequate of the promoting agent. It is possible to employ a material having a lower solubility than indicated hereinabove, however, it will be found that less satisfactory results are produced with respect to catalyst activity. The exact function of the promoting agent is not known, however, it is preferred that the promoting agent is volatilized from the catalyst mass at a temperature of about or below the calcination point. This is desired in order to avoid the deposition of undesirable cracked products on the finished catalyst product. The following are specific examples of promoting agents which are useful for the purposes of the present invention: methanol, ethanol, propanol, butanol, pentanol, hexanol, heptanol, ethylene glycol, propylene glycol, glycerol, acetone, methyl ethyl ketone, methyl propyl ketone, phenols, benzyl alcohol, etc.

THE AMMINE COMPLEX PREPARATION

The promoting agent of this invention can be used to provide novel catalysts which are derived from various novel or known methods of preparation. A catalyst preparation which has been found to be particularly adapted to the improvements of the present invention comprises adding a platinum or palladium ammine complex to an adsorptive carrier material, such as for example, alumina gel and then drying and calcining the mass to a finished product. The platinum or palladium ammine complex is prepared from ammonia or substituted ammonia compounds, e. g., the amines and a platinum or palladium compound. The methods for preparing the ammine complexes are readily known by those skilled in the art to involve complexing a platinum or palladium compound, such as a salt, e. g., a halide, nitrate, sulfate, sulfite, nitrite, oxyhalide, etc., with ammonia or substituted ammonia, e. g., alkylamine, alkyldiamine, quinolines, pyridines, hydrazo compounds, hydroxylamines, etc. The platinum or palladium in the complex may have a co-ordination valence of 4 or 6. The ammine complexes may be soluble in the polar or non-polar solvent which is employed for facilitating the catalyst preparation, or such ammines can be colloidally dispersed in either a polar or non-polar solvent in the required quantities. In either case, the solution or suspension of ammine complex should be employed in quantities which will provided adequate distribution of the complex throughout the entire catalyst mixture in the desired manner. However, it is preferred to employ the water soluble ammine complexes by reason that these compounds result in very effective types of catalysts. Specific examples of complexes which may be suitable for this invention include nitritodihydroxylaminoammineplatinous chloride, nitritoethylenediaminoammineplatinous chloride, nitritopyridinodiammineplatinous chloride, tetrahydrazinoplatinous chloride, dihydrazinodiammineplatinous chloride, trispropylenediaminoplatinic chloride, nitritodichloroethylenediaminomethylaminoplatinic chloride, dichloroquatermethylaminoplatinic chloride, dichlorobisethylenediaminoplatinic chloride, chloronitritopyridinotriammineplatinic chloride, tetrahydroxylaminoplatinous chloride, hydroxylaminotriammineplatinous chloride, quatermethylaminoplatinous chloride, bismethylaminodiammineplatinous nitrate, dihydrazinodiammineplatinous chloride, quaterpyridinoplatinous sulfate, bispyridinopalladic chloride, biethylenediaminopalladous chloride, etc.

The support or carrier material for the platinum or palladium includes, for example, alumina, silica gel, silica-alumina, titania, zirconia, charcoal, pumice, kieselguhr and the like. Among the carriers mentioned, it is preferred to employ an alumina support because of the particularly good results which are obtained by means of the present invention. The aluminas are prepared from synthetic alumina hydrate, known as Gibbsite, which is obtained by the precipitation of a sodium aluminate solution in the Bayer process, and from Bayerite which may be produced by fusing bauxite with sodium carbonate and employing carbon dioxide as a precipitant. For the purposes of this invention a synthetic hydrated gel formed by precipitating a solution of an aluminum salt, for example, aluminum chloride, with ammonium hydroxide is preferred. In the preparation of the catalyst, it is preferred that the alumina be mixed as a freshly prepared hydrate with the platinum or palladium. In the case of alumina gel, the preferred procedure for dispersing the platinum or palladium is to peptize the slurry of the gel with acetic acid or any other suitable agent to a pH of from about 3.0 to about 8.0 and preferably between about 4.0 and 6.0, preferably before adding the ammine complex. When the alumina is to be stored because of processing considerations, it may be dried at a temperature below about 400° F. The term "alumina gel" is intended hereafter to include a wet or dry alumina which is not soluble in water in the gel form and which is derived from gels or capable of forming gels by suitable adjustment of the acidity.

The relative quantities of the platinum or palladium ammine complex and the carrier material are determined by the final composition of the catalyst which is desired. Ordinarily, the quantity of metallic platinum or palladium in the final catalyst product ranges from about 0.01 to about 5% by weight. Therefore, the quantity of platinum or palladium ammine complex which is combined with the adsorptive carrier material is determined on the basis of the desired quantity of metallic platinum or palladium in the final catalyst composition. Likewise, the amount of adsorptive material will be determined by difference. For most pratical purposes, the concentration of platinum and palladium in the catalyst product should be in the range of about 0.1 to 1% by weight of the metal, because the benefits derived from higher quantities of platinum are usually not justified by the cost of the platinum material used in preparing the catalyst.

After the ammine complex has been thoroughly mixed with the carrier material, which can be in the form of a gel, a dried material, or a calcined material, and the promoting agent of this invention, the mixture is dried and calcined. In the case of an alumina gel, the drying temperature is not critical and usually drying can be accomplished by heating at a temperature not greater than about 400° F., preferably about 200° to about 250° F. for a period of about 15 to 50 hours. Alternatively, the slurry can be dried and calcined in a single operation by being placed in an oven which is maintained at the temperature in the order of at least about 600–700° F. It is preferred that the promoting agent of this invention is volatilized from the catalyst mass by the time the calcination temperature is reached. The calcination procedure is important, because the ammine complex is decomposed to metallic platinum or palladium. The decomposition of the ammine complex can take place at a temperature of at least about 400° F. Generally, it is important in the calcination procedure to avoid an excessively high temperature, because there is a tendency for the catalyst to become permanently deactivated. Therefore, it is the general practice to calcine the catalyst mass at a temperature of at least about 600° F. and a temperature not greater than about 1500° F., for a period from about 2 to 6 hours. It is not desired to exceed a temperature of 1500° F. for calcination, unless a stabilizer such as silica gel is incorporated in the carrier. However, it is preferred to calcine the mixture of carrier material, promoting agent, and the platinum or palladium ammine complex at a temperature between about 700° and about 1200° F. for about 3 to 6 hours. Calcination appears to be about the best method of reducing an ammine complex. However, it is also contemplated to reduce the complex by passing hydrogen over the dry material at moderately elevated temperatures. Further, the metal may be deposited on the carrier material before drying by the addition of a reducing agent, such as for example, hydrazine or citric acid, to the ammine complex.

The catalyst product prepared in accordance with the above method may be substantially free of combined halogen or it may contain combined halogen in amount of about 0.2 to about 8% by weight of the total product. In obtaining the desired halogen content for a catalyst which is prepared from aluminum chloride, the gel is washed with water or ammoniated water until the halogen content of the wash water is zero or negligible. Thereafter, it is preferred adding halogen in the form of a halogen halide, etc. in the desired proportion. Such a technique lends to a more accurate control of the combined halogen in the catalyst product.

The presence of silica in the catalyst product serves to stabilize the catalyst towards high temperatures, and in addition, it can cause the inhibition of cracking reactions in a hydro-forming process. The inhibition of cracking by silica is observed at low concentrations of silica in the order of about 0.05 to 15%, preferably about 1 to 10% by weight of silica, based on the total weight of the catalyst product. The silica is added to the catalyst as a gel in the preliminary steps discussed above, preferably with the other carrier material. Ordinarily, the other carrier material, e. g., alumina gel and the silica gel are combined in the desired relative amounts prior to mixing with the platinum or palladium ammine complex.

THE ACTIVATED CATALYST PREPARATION

The improvements of the present invention can also be realized for a catalyst which is prepared by the method comprising the decomposition of a compound of the metal selected from the class consisting of platinum and palladium to form a metallic residue on a adsorptive carrier material in the presence of a metal such as mercury, zinc or cadmium or a compound thereof. The salts of mercury, zinc or cadmium, serve as an activating agent in producing a catalyst of substantially greater activity than catalysts which are prepared without the presence of the activating agent. The activating agent may remain in the final catalyst in certain instances, however, preferably it is a voltile material which evaporates or decomposes, either at or below the temperature at which the catalyst is calcined, or at the operating temperature at which the catalyst is maintained under conversion or regeneration conditions.

The activating agent can be used in the form of an organic or inorganic compound of mercury, zinc or cadmium, or mixtures of the foregoing compounds. The inorganic compounds of mercury, zinc or cadmium include the oxides, hydroxides and salts thereof. The inorganic salts of mercury, zinc and cadmium include, for example, the chlorides, chlorates, bromides, nitrates, sulfates, nitrites, sulfides, sulfites, carbonates, bicarbonates, oxychlorides, fluorides, iodides, phosphates, phosphites, etc. Specific examples of inorganic compounds of mercury, zinc and cadmium are mercuric bromide, meruric chlorate, mercuric acetate, mercuric chloride, mercuric cyanide, mercuric nitrate, zinc acetate, zinc bromide, zinc chlorate, zinc hydroxide, zinc nitrate, zinc sulfide, cadmium acetate, cadmium carbonate, cadmium hydroxide, cadmium cyanide, cadmium iodide, etc.

The organic compounds of mercury, zinc and cadmium which are useful as activating agents include a variety of classes, such as for example, the salts of the aliphatic and aromatic carboxylic acids, the aliphatic and aromatic sulfur salts, as well as the aliphatic and aromatic phosphorous acids, etc. Particularly useful compounds of mercury, zinc and cadmium are the aliphatic carboxylate salts such as those derived from the fatty acids, the carbonic acids, the thiocarbonic acids, etc. Specific examples of activator salts of the aliphatic carboxylic acids are the monobasic types, such as for example, mercurous acetate, mercuric propionate, mercuric butyrate, mercuric valerate, zinc acetate, zinc formate, zinc caproate, cadmium acetate, cadmium propionate, mercury ethyl carbamate, mercury propyl carbamate, zinc butyl carbamate, cadmium pentyl carbamate, mercury ethyl xanthate, zinc propyl xanthate, cadmium butyl xanthate, etc. The aliphatic polycarboxylic acids can also be used. Useful mercury, zinc and cadmium salts of aromatic carboxylic acids can be of the mono- or polybasic type. Examples of such salts are mercurous benzoate, zinc benzoate, cadmium benzoate, mercuric phthalate, zinc phthalate, cadmium phthalate, mercurous salicylate, zinc salicylate, cadmium salicylate, etc.

It is preferred that the activating agent volatilize from the catalyst mass at or before calcination temperatures. In some instances the activating agent is not volatilized at such temperatures, consequently the calcination operation may be conducted under sub-atmospheric pressures in order to remove substantially all or completely the activating agent from the catalyst mass. Moreover, it is preferred to employ activating agents which volatilize from the catalyst mass at a temperature not greater than about 1200° F. It should be understood that all of the activating agents described above are not equivalent in efficacy for the purposes of this invention, because under certain conditions some are more desirable or effective than others.

Ordinarily, in the preparation of the catalyst, the activating agent can be added to the carrier material prior to the addition of the platinum or palladium compound; or the activating agent can be added to the mixture of carrier and platinum or palladium compound; or the addition of the activating agent can be made to the platinum or palladium compound prior to mixing the carrier therewith. In adapting the preparation of this catalyst to the present invention, the promoting agent can be added to any one of the components or mixtures of two or more of said components. The quantity of activating agent employed is about 0.01 to about 10.0%, preferably about 0.5 to about 5.0% based on the weight of the carrier. For example, a mercury compound should be mixed with a carrier such as for example alumina gel in such proportions as to produce a mercury to alumina dry weight ratio of about 0.0001 to 0.1 or higher. In this type of a preparation, the action of the activating agent is not completely understood, although it produces an effect on the catalyst which greatly enhances its activity over any catalyst prepared in the same manner with the activating agent omitted. Whatever may be the change in the catalyst resulting from the introduction of the activating agent into the mixture of constituents from which the catalyst is manufactured, it is not necessary that the activating agent remain in the final catalyst product. As a practical matter, it is preferred to employ activating agents which volatilize below about 1000° F. or 1050° F. and which will leave no apparent trace of residue in the finished catalyst.

In the preparation of the activated catalyst, the platinum or palladium is distributed on the carrier by employing initially a compound of a metal which will decompose to form metallic platinum or palladium at calcination temperatures. The desired form of starting material can be prepared by saturating an aqueous solution of chloroplatinic acid or chloropalladic acid with hydrogen sulfide. Other starting materials can be employed, such as for example, platinum amine complexes, chloroplatinic acid, ammonium and potassium chloroplatinates and chloroplatinites, the corresponding palladium compounds and the like. Those platinum or palladium compounds which are readily decomposable or reducible to metallic platinum or palladium by heating or by the action of reducing agents usually produce the best type of catalyst. The metallic platinum or palladium content of the final catalyst should be from about 0.01 to about 5.0% by weight, preferably about 0.1 to about 1.0%.

The carrier material for the activated catalyst is prepared in essentially the same manner as described hereinabove with regard to the catalyst obtained from platinum or palladium ammine complex compounds. As indicated hereinabove, with respect to the preparation of the platinum or palladium ammine complex type catalyst, the final product may contain less than about 0.1% by weight on a dry basis of combined halogen. On the other hand, it is also contemplated by means of the present invention to obtain a final catalyst having a combined halogen content in the order of about 0.2 to about 8% by weight.

With respect to the above catalyst preparation, the promoting agent of this invention, viz., a water soluble alcohol or water soluble ketone can be incorporated into the catalyst mass by the following methods: (1) with the carrier material either before or after drying and/or calcination; (2) with the activating agent described above; (3) with platinum or palladium compound; or (4) the promoting agent can be added to a mixture of any two or more of the components discussed above. After the activating agent, the platinum or palladium compound, the carrier material and the promoting agent have been thoroughly mixed, the mixture is dried and calcined. The drying operation can be conducted at a temperature of not more than about 400° F., preferably about 200° to 250° F. for a period of about 15 to 50 hours. Alternatively, drying can be accomplished by a flash technique which involves subjecting a slurry of catalyst mass into an oven which is maintained at an elevated temperature, for example, at least about 600°–700° F. After drying the catalyst mass, it is calcined at a temperature of at least about 400° F., however, more usually at a temperature in the range of about 600° to about 1500° F., preferably about 700° to about 1200° F., and for a period of about 2 to 6 hours or more.

In the above type of catalyst an improvement in catalytic property is accomplished by incorporating small amounts of silica therein. It was observed that the presence of small amounts of silica in the catalyst inhibited cracking thereby providing a catalyst material which is unusually desirable for hydroforming reactions. During the preparation of the catalyst, the silica can be introduced in the form of a silica gel which is combined with the carrier material, e. g., alumina gel, preferably before adding either the activating agent, the promoting agent and/or the platinum or palladium compound. The silica content which is found satisfactory for purposes of inhibiting cracking reaction is about 0.5 to about 15%, preferably about 1 to 10% by weight of the total catalyst product.

The improvements of the present invention can be also realized in the case of platinum or palladium catalysts which are prepared by methods other than those described above.

Other methods of preparation involve, for example, catalysts prepared by (1) the method of precipitating platinum or palladium onto a carrier, e. g., alumina as platinum or palladium oxide by boiling potassium chloroplatinate, etc., and then reducing the oxide with a suitable reducing salt; (2) the conversion of a chloroplatinic or suitable palladic acid with hydrogen sulfide to form a platinic or palladic sulfide slurry which is then mixed with the carrier, e. g., alumina gel, dried and calcined at elevated temperatures; and other well-known methods of preparing a platinum or palladium type of catalyst are included within the scope of the present invention. Regardless of the method used in precipitating or depositing metallic platinum or palladium on the carrier, it is generally proposed obtaining a promoted catalyst having a platinum or palladium content of about 0.01 to about 5% by weight, preferably about 0.1 to 1% by weight, based on the total weight of the catalyst. The final catalyst can contain less than 0.2% by weight of combined halogen, e. g., fluorine or chlorine, or it may contain about 0.2 to 8.0% by weight of combined halogen. Likewise, the catalyst may contain alumina as the carrier, either alone or in combination with minor or small proportions of silica in the amount of about 0.01 to about 15%, preferably about 1 to 10% by weight.

Generally, the promoting agent of the present invention is incorporated into the catalyst mass by one of the following methods: (1) it is combined with the carrier material prior to mixing with the platinum or palladium compound with or without the activating agent; (2) by mixing the promoting agent with the platinum or palladium compound prior to mixing same with the other components of the catalyst mass; (3) mixing the promoting agent with the activating agent prior to incorporation of same with either the carrier material or the platinum or palladium compound; or (4) mixing the promoting agent with a mixture of the catalyst components prior to the drying or the calcination operation. The amount of promoting agent employed is determined on the basis of the water which is present in the catalyst mass prior to subjecting same to a drying and/or calcination operation. It is desirable to ordinarily use about 1 to about 50% by weight, preferably about 10 to about 40% by weight of the promoting agent, based on the weight of water which is present in the catalyst mass, prior to subjecting the mass to a drying and/or calcination operation. It is preferred that the promoting agent be volatilized substantially or completely from the catalyst mass at about the calcination temperature. However, it is included within the scope of this invention to have a small residue from the promoting agent in the final catalyst product. The exact nature of the promoting agent is not clearly understood, however, the effects observed in the use of a catalyst which has been prepared with a promoting agent clearly shows that the activity is substantially increased over those catalysts which are derived without the utility of a promoting agent.

After mixing or combining the components of the catalyst mass, including the promoting agent of this invention, the mixture is generally subjected to an initial drying operation which is accomplished at a temperature of not more than about 400° F., preferably about 200° to about 250° F. and for a period of about 15 to about 50 hours. During the drying step, when using a low boiling point promoting agent, it is found that a substantial part or all of the promoting agent is vaporized or volatilized from the catalyst mass. Beneficial effects in catalyst activity are obtained even though the promoting agent is substantially all or completely removed from the catalyst mass at a relatively low temperature, such as during the drying operation. In other cases, where the promoting agent is less volatile, it remains in the catalyst mass for a longer period of time and usually until the calcination temperature is reached. It is not essential that the promoting agent be removed completely from the catalyst mass at the time of reaching calcination temperatures. It is also contemplated that part of the promoting agent be removed during the calcination operation, although it is preferred that substantially all of this agent is removed from the catalyst mass at the time of reaching the calcination temperature. This is desirable in order to avoid any undesirable effects from cracking the promoting agent at elevated temperatures.

Calcination is an important step in the method of producing the promoted catalyst because in this operation, the platinum or palladium compound is decomposed to metallic platinum or palladium on the carrier material. The conditions of calcination are important from the standpoint that all of the platinum or palladium compound should be decomposed to metallic platinum or palladium and the metal should be distributed throughout the carrier material in a way which will produce the greatest catalytic activity. Generally, calcination is conducted at a temperature greater than about 400° F., more usually in the range of about 600° to about 1500° F., preferably about 700° to about 1200° F. The catalyst mass is held at the elevated temperature for a period of about 2 to about 6 hours or more; whereas in the preferred temperature range the mass is calcined for about 3 to about 6 hours.

In order to more fully understand the nature of this invention, specific examples of the method of preparation of the catalysts of this invention are given hereinbelow. However, it should be understood that no undue limitations or restrictions should be imposed by reason thereof.

*Example I*

The alumina gel was prepared by dissolving 5682 grams $AlCl_3 \cdot 6H_2O$ (1200 grams $Al_2O_3$) in 18 liters of water and adding 4400 cc. of concentrated $NH_4OH$ (28% $NH_3$) and 2 liters of water. The pH after ¾ hour of stirring was 6.98 at 28.5° C. The gel was filtered and washed with ammoniated water until the filtrate from the tenth wash gave a very slightly positive chloride test. A final wash was made with water. The precipitate was slurried in 3 liters of water and analyzed 13.1% $Al_2O_3$ and 0.05% chlorine. The 9481 grams of slurry were peptized with 64 cc. of glacial acetic acid which was diluted with an equal part of water. The pH of the peptized slurry was 4.51 at 24° C.

The tetramine platinous chloride solution was made by dissolving 4.1 grams of platinous chloride in 350 cc. of concentrated $NH_4OH$, by adding the aqua ammonia in aliquot portions and boiling. The resulting yellow solution was acidified with 35 cc. of glacial acetic acid to bring the pH to about 6, and then diluted with water to 400 ml.

The $Pt(NH_3)_4Cl_2$ solution was added dropwise to 4830 grams of the peptized alumina slurry while stirring. The mixture started to gel when about half of the ammine solution was added. An addition of 1.5 liters of butyl alcohol to the slurry was then made. The final pH was 5.41 at 25.5° C. The mixture was placed onto porcelain evaporating dishes and dried for about 50 hours at 240° F. in a "Despatch" oven. The catalyst dried to a white color with a layer of brownish yellow matter on the top surfaces. The dried catalyst was ground to a fine powder and then calcined for 3 hours at 1000° F. in a suitable furnace. 595 grams of catalyst were obtained which were pelleted into 3/16 inch pills and recalcined for 3 hours at 1000° F. A volume of 550 cc. of catalyst weighed about 383 grams. The catalyst contained 0.42% platinum.

Example II 5210 grams of $AlCl_3 \cdot 6H_2O$ was dissolved in 14 l. of water and when mixed with 3.8 liters of concentrated ammonium hydroxide the alumina gel was precipitated. 300 ml. of the ammonia and 3 l. of water were added further to adjust the pH to 7.10 at 32° C. and yield a stirrable mass. After filtering this mass, the filter cakes were washed to remove chlorine compounds by reslurrying with 13 l. of water and 130 ml. of concentrated ammonium hydroxide for one hour and then filtered again. After 9 more similar washings only a faint chloride test was obtained in the filtrate. The washed alumina gel was peptized with 32 cc. of glacial acetic acid (0.1 mol $CH_3COOH$/mol $Al_2O_3$), which lowered the pH to 4.35 at 20° C.

The platinum ammine complex was prepared by dissolving 4.24 gm. of platinous chloride in 375 cc. of concentrated ammonium hydroxide. Thereafter about 5 ml. of glacial acetic acid was added to the mixture to obtain a pH of substantially 7.

The ammine complex thus prepared was poured rapidly into the alumina and the mixture stirred for one hour. At this point the pH was observed to be 5.57 at 23° C., and the slurry displayed a tendency to set to a gel. The slurry was dried for 36 hours at 230–240° F. in a porcelain dish in a small oven to produce 807 gm. of a dried solid having a yellow tint on the top of the white alumina. The dried mass was then ground to a size small enough to pass through a 40 mesh screen and then calcined for two hours at 1000° F. The 563 gm. of resulting material were grayish with small black specks throughout. After pelleting the catalyst, the pellets were calcined at 1000° F. for an additional 4 hours. The catalyst pellets were gray in color, speckled with black and had a platinum content of 0.47%.

Examples I and II above illustrate methods of preparing the catalyst by (1) using a promoting agent of the present invention and (2) preparing the catalyst in a similar manner without the use of the promoting agent, respectively. These catalysts were later tested under hydroforming conditions and the results are reported hereinbelow.

In the following examples, there is illustrated the preparation of a catalyst employing an alumina gel which is derived by a method other than what is employed in Examples I and II above, and with and without the use of a promoting agent of the present invention.

Example III

The alumina prepared from reacting aluminum sulfate with concentrated ammonium hydroxide had the following composition:

| | Weight percent |
|---|---|
| Ignition loss or volatile material at 1500° F | 78.89 |
| $SO_4$ | 0.47 |
| Analysis of ignited solid: | |
| $Al_2O_3$ | 99.15 |
| $SO_4$ | 1.70 |
| $Na_2O$ | 0.014 |
| $Fe_2O_3$ | Trace |

1700 gm. of the unignited alumina described above was slurried in 960 cc. of water for about 20 minutes using high speed stirring equipment. The pH of the thick slurry was 8.04 at 25° C. To the slurry was added 30 cc. of glacial acetic acid which had been previously diluted with an equal part by volume of water in order to peptize the alumina gel. After 15 minutes the peptized solution showed a pH of 4.64 at 28° C. An additional 3 cc. of the above described diluted glacial acetic acid was added to the slurry to lower the pH to 4.52 at 28° C. The total time for peptization was 45 minutes.

170 cc. of platinous tetra-ammine chloride solution, $Pt(NH_3)_4Cl_2$, were added to the slurry of alumina in a dropwise manner over a period of about 10 minutes. The platinum solution contained 0.01027 gm. of platinum per ml. The mixture became thick and after 15 minutes of stirring it showed a pH of 4.70 at 26.5° C. The slurry was stirred an additional 5 minutes before adding 870 cc. of butanol, in a concentration which gave 1.5 l. of butanol per 600 gms. of alumina. The mixture thickened and after 20 minutes of stirring the pH was 4.82 at 32° C. The stirring was continued for an additional 18 minutes; the vibrant soft gel was placed on a large porcelain evaporating dish and dried for a period of 64 hours in an Elconap oven at 230° F. The dried catalyst was essentially white, opaque and some brown color was observed on a portion thereof.

The dried catalyst was ground to a powder and weighed 457 gm. After calcination at 1000° F. for a period of 3 hours, the catalyst material was pelleted in 3/16 in. size and calcined an additional 3 hours at 1000° F. The pellets were dark brown and slightly speckled and contained about 0.48% platinum.

Example IV 2400 gm. of the unignited alumina described in Example III were slurried in 1530 cc. of distilled water to provide an alumina content of 12.6% after stirring for 7.5 hours. The slurry was very thick and it had a pH of 7.92 at 30° C. The slurry was then peptized by adding 56 cc. of diluted acetic acid, which was prepared by diluting equal parts of glacial acetic acid, and water. The resultant slurry had a pH of 5.42 at 38° C. A further addition of 34 cc. of diluted acetic acid as described above lowered the pH to 4.70 at 38° C.

The peptized slurry of alumina was combined with 244 cc. of platinous tetra-ammine chloride solution, $Pt(NH_3)_4Cl_2$, which was added dropwise to the alumina over a 5 minute period. After 22 minutes the pH was 5.01 at 38° C. and the slurry started to thicken. After an additional 8 minutes the thick homogeneous gel was transferred to a large evaporating dish and dried in an Elconap oven for about 64 hours at 240° F. The dried catalyst was white, opaque and glassy with a small amount of yellow color on the surface thereof. The catalyst was then ground to a powder and calcined for 3 hours at 1000° F. The calcined catalyst was dark brown and containing black specks throughout. 510 gm. of the catalyst were pelleted in 3/16 in. pills and calcined for an additional three hours at 1000° F. The resultant pellets were light gray and speckled. The catalysts contained 0.49% platinum.

Catalysts prepared according to the present invention possess numerous outstanding advantages and have a wide field of utility. In general, it appears that these contact materials are suitable for any reactions which are susceptible to catalysis with platinum or palladium. They are useful in a variety of hydrocarbon conversion reactions, particularly those in which the hydrogen-carbon ratio is altered. Among the numerous reactions which lend themselves to catalysis by contact materials of the type disclosed herein are dehydrogenation, hydrogenation, hydrogenolysis, cracking, hydrocracking (i. e., cracking under hydrogen pressure), isomerization, oxidation, aromatization, cyclization, hydrodesulfurization, hydrocarbon synthesis, dealkylation, hydrodechlorination, dehydroxylation, alkylation, polymerization and hydrogen exchange systems. In general, these reactions may be carried out under the conventional reaction conditions of temperature, pressure, etc., with the catalysts described herein. However, in many instances the activity of the new contact materials permits the employment of less severe conditions, especially lower temperatures and contact times, without any sacrifice in yield. A wide variety of organic compounds may be dehydrogenated including naphthenes, paraffins, alkyl radicals in aralkyl compounds, butene, sterols, glycerides, and many other organic compounds. By changing the reaction conditions in known manner, these catalysts are also effective for hydrogenating organic compounds in general, and especially fatty glycerides and olefins. They may also be employed in the hydrogenolysis of nitrobenzene to aniline and similar chemical changes. Another utilization lies in the dehydroxylation or demethylation, or both, of cresylic acid-type compounds. Among the substances which can be isomerized with these catalysts, paraffins and naphthenes are the most significant feeds from a commercial standpoint; but polyalkyl aromatics may be similarly treated, as exemplified in the catalytic transformation of o-xylene to p-xylene. In addition to the more common cracking reactions, the contact materials of the present invention are especially suitable for cracking in the presence of hydrogen as in the hydroforming process in which the feed is customarily a low octane naphtha. In hydroforming with the novel catalysts a substantial degree of sulfur removal occurs and the reaction may readily be shifted to favor hydrodesulfurization rather than reforming by changing the reaction conditions in a manner familiar to those skilled in the art. The synthesis of hydrocarbons from carbon monoxide and hydrogen in the presence of the new contact materials is also contemplated. In the field of oxidative reactions, numerous changes can be effected with the present catalysts including, for example, the transformation of sulfur dioxide to sulfur trioxide, the formation of nitric acid and also of hydrazine from ammonia, the conversion of urea into hydrazine and the oxidation of hydrocarbons in general. An example of a catalytic hydrodechlorination reaction of current importance, which may be catalyzed by the newly disclosed agents, is that in which hydrogen converts trifluorotrichloroethane into trifluorochloroethylene and hydrogen chloride. The contact materials of the present invention are also suitable for the hydrogen exchange systems as exemplified by the hydrogenation of coal with decalin and tetralin. By reason of their aromatizing and cyclizing characteristics they are outstanding in preparing benzene, toluene and the like in substantial yields from paraffins and naphthenes and also for the production of more highly cyclized compounds such as naphthalene, anthracene and alkyl substituted derivatives thereof under suitable conditions. In addition, polymerization and alkylation reactions are responsive to these catalysts; for example, the polymerization of olefins and the alkylation of aromatic compounds.

The present catalysts are especially useful for the reforming or hydroforming of naphthas into gasoline stocks of improved antiknock characteristics. Many benefits result from hydroforming with the new catalysts in comparison with known reforming catalysts, including those containing platinum. After partial deactivation due to the deposition of carbonaceous matter during hydroforming, the contact materials disclosed herein have been regenerated several times by combustion in an oxygen-containing gas with substantially full restoration of activity. This adaptability to regeneration is extremely important as it permits a broad variety of feed stocks to be processed successfully, including those of substantial olefin or sulfur contents and/or having end points considerably in excess of 400° F. This is not believed to be true of the presently used platinum-reforming catalysts which appear to be non-regeneratable and are thought to require a carefully prepared feed stock of low olefin and sulfur content and having a final boiling point well below 400° F. and to be limited to rather mild hydroforming conditions in order to minimize the formation of deactivating deposits on the contact material in the conversion reaction. No such concern over the feed to the catalysts of the present invention is necessary, as carbonaceous and sulfur-containing substances are readily removed during the regeneration operation. Moreover, severe hydroforming conditions may be freely used as required in the production of higher antiknock fuels. In addition to being superior to all known hydroforming catalysts in activity and the quantity of aromatics produced, superior flexibility and high selectivity have also been noted in comparison with other known platinum reforming catalysts, especially in the higher octane ranges, and the novel platinum-alumina catalysts are unmatched by regeneratable hydroforming catalysts in low production of carbonaceous deposits. Many economies in investment and operating costs are realized in hydroforming with the novel contact materials as a result of the smaller reactor, smaller separate regeneration vessel in a continuous system, longer on-stream period in a fixed bed system or lower regenerated catalyst replacement rate in a continuous system, and improved product selectivity.

The catalysts prepared in accordance with the present invention are particularly adapted for hydroforming naphtha stocks. In hydroforming naphtha or gasoline stocks with the catalyst disclosed herein, the conditions may be varied rather widely; thus temperatures of about 600 to about 1050° F. are suitable and the preferred range is from about 800 to about 950° F. Within these temperature limits, weight space velocities of about 0.05 to about 10.0 pounds of naphtha per hour per pound of catalyst in the reaction zone may be employed advantageously; however, space velocities of about 0.25 to about 5.0 provide the best results. Hydrogen should be introduced into the hydroforming reactor at rates running from about 0.5 to about 20.0 mols of hydrogen per mol of hydrocarbon reactants. This hydrogen may be in admixture with light gaseous hydrocarbons. In fact, it is usually introduced by recycling the normally gaseous products, chiefly hydrogen along with about 10% more or less of 1 to 3 carbon hydrocarbons, of the hydroforming reaction. The hydrogen serves an important function in maintaining the activity of the contact material by minimizing coke deposition thereof. While the total reaction pressure may be maintained at any value between about 50 and about 1000 pounds per square inch gauge (p. s. i. g.), the best results are obtained by holding the reaction pressure within the range between about 100 and about 750 p. s. i. g. In any event, the hydrogen pressure should not be allowed to become so great under any given set of reaction conditions that destructive hydrogenation is inaugurated, as this will result in a net consumption rather than a net production of hydrogen in the reaction.

The following data illustrates the superiority of catalysts prepared in accordance with the present invention as compared to catalysts which are not prepared by the use of a promoting agent. The experimental data was obtained by hydroforming petroleum naphtha stock.

The catalysts of the above examples were tested by hydroforming a Midcontinent heavy naphtha having an initial boiling point of 230° F. and an end point of 428° F. This naphtha had an octane number (CFRM) of 30 and contained approximately 9% aromatics by volume. By reason of its relatively low naphthenic content and the high end point, this is regarded as a difficult hydroforming stock with a tendency to form relatively large coke deposits. The catalysts were tested on a laboratory scale using a fixed bed of approximately 475 grams of pelleted catalyst. The hydrogen was fed in a pure state at the rates indicated (SCFB) in the table, measured as standard cubic feet per barrel of oil feed (measured at 60° F. and 760 mm. mercury). The regeneration of the catalyst was conducted by purging the catalyst with hydrogen after the catalyst became partially deactivated by the accumulation of carbonaceous deposits. The pressure on the system was released and then purged with nitrogen. The catalyst was then heated to 950° F. and air was introduced along with nitrogen. The concentration of air was regulated to produce a maximum temperature of 1050° F. in the catalyst bed. During this operation the temperature of various points in the bed was ascertained with two thermo-couples, one located in the upper part, and one in the lower part of the bed. The flow of nitrogen and air through the bed was continued for about ½ hour after the temperature dropped to about 950° F. Following another nitrogen purge, the system was again placed under hydrogen pressure for about 1 hour while the hydrogen rate and temperature was being adjusted before feeding the naphtha again.

TABLE I

| Catalyst | Ex. I | | | Ex. II | Ex. III | Ex. IV |
|---|---|---|---|---|---|---|
| Test No. | 1 | 2 | 3 | 4 | 5 | 6 |
| Operating Conditions: | | | | | | |
| Temperature, °F. | 900 | 903 | 898 | 900 | 900 | 900 |
| Pressure, p. s. i. g. | | 500 | | 500 | 500 | 500 |
| Space velocity, W₀/hr./W₍. | 1.02 | 2.01 | 3.06 | 0.97 | 1.00 | 0.99 |
| Hydrogen rate, S. O. F. B. | 5,090 | 4,830 | 5,380 | 4,670 | 5,227 | 4,375 |
| No. of Regenerations | 1 | 2 | 3 | 2 | 1 | 1 |
| Yields (Output Basis): | | | | | | |
| 100% C₄ Reformate, Vol. Percent | 89.7 | 91.0 | 92.5 | 89.8 | 93.5 | 91.7 |
| 10# RVP. Reformate, Vol. Percent | 82.2 | ¹96.5 | ¹99.5 | 94.0 | ¹98.0 | ¹95.6 |
| Dry Gas, Wt. Percent | 11.5 | 7.4 | 5.6 | 9.2 | 7.0 | 8.7 |
| Octane No. CFRR: | | | | | | |
| 100% C₄ Reformate | 94.2 | 83.0 | 75.9 | 86.3 | 81.6 | 78.8 |
| 10# RVP Reformate | 93.7 | 84.0 | 77.8 | 86.9 | 82.4 | 79.7 |

¹ Extraneous butane added to reformate to obtain a 10# RVP product

For purposes of comparison, test Nos. 1 and 4 clearly demonstrate the higher activity of the catalyst which is prepared with the use of a promoting agent of this invention. It is noted that in the case of test No. 1 which employs a freshly prepared promoted catalyst, the research octane number of the total liquid product reported as 100% C₄ reformate was substantially higher than in test No. 4 which employs the unpromoted fresh catalyst. By means of tests Nos. 2 and 3 which involve the same type of catalyst as in test No. 1, it has been possible to determine the comparable space velocity of the catalyst of test No. 1 in order to obtain the product distribution and octane number of the product as shown in test No. 4. On this basis, the catalyst prepared in Example No. 1 is about 1.7 times as active as the catalyst which is prepared in accordance with Example No. 2.

It is also to be noted that in tests Nos. 2 and 3, the catalyst had undergone two and three regenerations prior to obtaining the data reported in the table. It should also be noted that in tests Nos. 2 and 3, the space velocity has been increased to 2.01 and 3.0, respectively. At higher space velocities, it is to be expected that higher yields of reformate and lower octane numbers are obtained. However, notwithstanding the regeneration of the catalyst, favorable product distribution is obtained as well as exceptionally good quality for the conditions of operation. These tests demonstrate that the novel catalyst of this invention can be regenerated without undergoing any significant decrease in catalyst activity. This characteristic of the novel catalyst permits the use of feed stocks having higher boiling end points than has been the practice to use heretofore. Furthermore, it is possible to employ feed stocks having a higher sulfur content than has been permissible in view that the sulfur compounds can be removed from the catalyst by regeneration.

Tests Nos. 5 and 6 present a comparison between a catalyst which has been prepared by using a promoting agent of this invention and one which was prepared without the use of the promoting agent. The main difference in the catalyst used in tests 5 and 6 over the catalysts used in tests 1, 2, 3 and 4 is that the alumina was prepared by a different method. From the data, it is apparent that the superiority of a catalyst which is prepared by the use of a promoting agent will be obtained notwithstanding any differences in the method by which the alumina is derived. In test #5 the total liquid product, including the butanes, which is designated as 100% C₄ reformate is higher than the yield in a similar product obtained in test #6. Furthermore, the octane number of this product in test #5 is higher than the corresponding product in test #6. Clearly, therefore, a catalyst prepared by the use of a promoting agent increases the yield of the product and is more selective in the type of reactions which take place during the hydroforming operation.

Having thus illustrated the present invention by reference to specific examples, it should be understood that no undue limitations or restrictions should be imposed by reason thereof.

I claim:

1. A process which comprises combining a previously undried hydrous carrier material and a water soluble ammine complex of a metal selected from the group consisting of platinum and palladium, adding a water soluble promoting agent selected from the class consisting of an alcohol and a ketone to the resultant mixture, and then heating the total mixture to effect the decomposition of the said water soluble ammine complex and thus produce a metallic residue on porous carrier material.

2. A process which comprises combining a previously undried hydrous carrier material and a water soluble ammine complex of a metal selected from the group consisting of platinum and palladium, adding a water soluble alcohol to the resultant mixture, and then heating the total mixture to effect the decomposition of the said water soluble ammine complex and thus produce a metallic residue on porous carrier material.

3. The process of claim 2 wherein the water soluble alcohol is a water soluble alkanol.

4. The process of claim 2 wherein the carrier material is alumina.

5. A process which comprises combining a previously undried hydrous alumina gel and a water soluble ammine complex of platinum, adding a water soluble alkanol to the resultant mixture, and then heating the total mixture to effect the decomposition of the platinum water soluble ammine complex and thus producing a metallic residue on porous alumina gel.

6. A process which comprises combining a previously undried hydrated alumina gel and tetrammine platinous chloride, adding butanol to the resultant mixture, drying the total mixture at a temperature not greater than about 400° F., and calcining the dried mixture at a temperature of about 700° to about 1200° F. for a period of about 2 to about 6 hours, thus producing a platinum residue on porous alumina gel.

References Cited in the file of this patent

UNITED STATES PATENTS

| | | |
|---|---|---|
| 1,956,585 | Oglesby et al. | May 1, 1934 |
| 2,162,276 | Weiss | June 13, 1939 |
| 2,385,469 | Salley | Sept. 25, 1945 |
| 2,486,361 | Nahin | Oct. 25, 1949 |
| 2,611,749 | Haensel | Sept. 23, 1952 |
| 2,623,860 | Haensel | Dec. 30, 1952 |

FOREIGN PATENTS

| | | |
|---|---|---|
| 343,285 | Great Britain | Feb. 19, 1931 |
| 594,463 | Great Britain | Apr. 11, 1942 |

OTHER REFERENCES

Maxted: J. Chem. Soc., vol. 119, pages 225–33 (1921).